Patented Dec. 7, 1926.

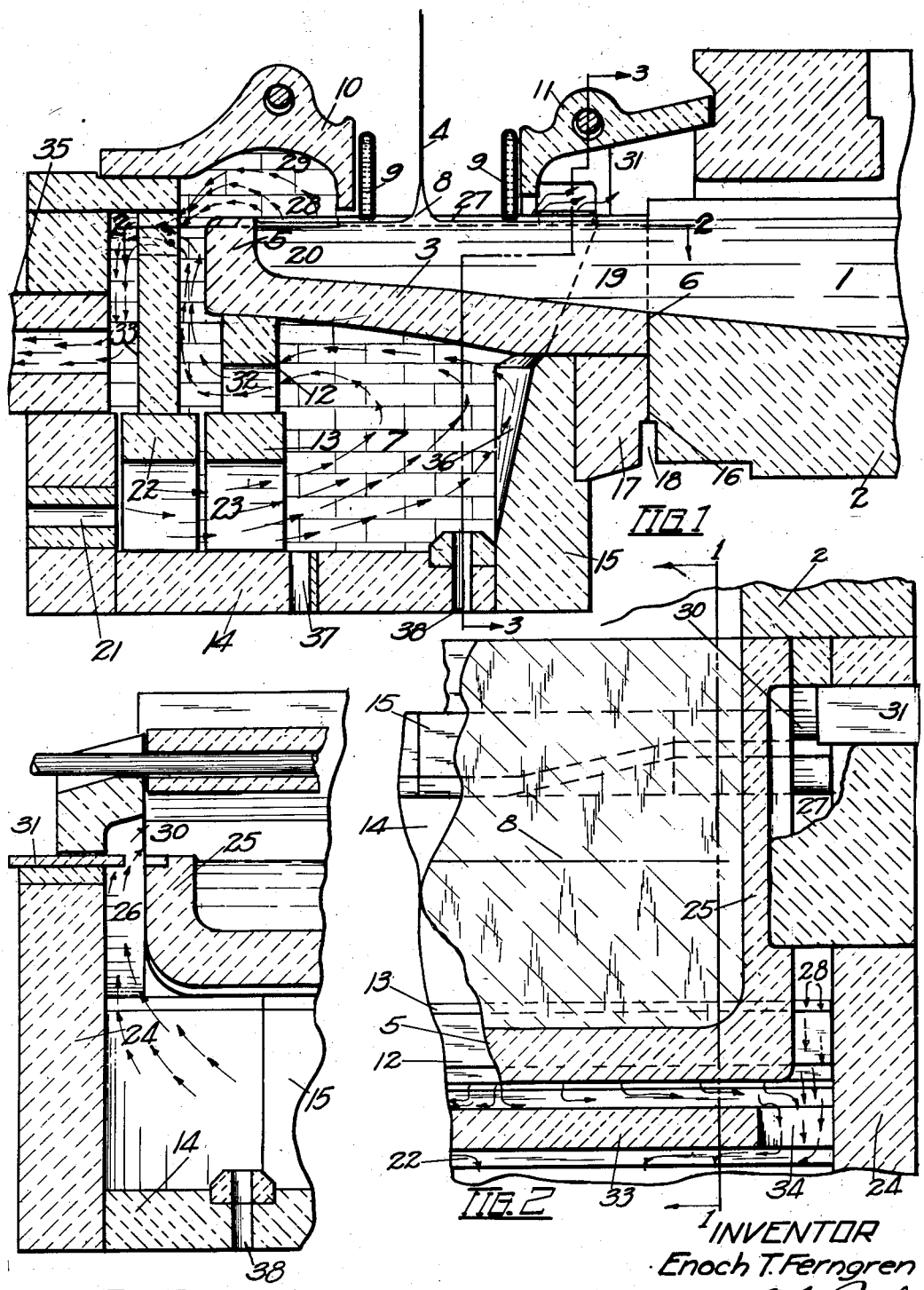

1,609,998

UNITED STATES PATENT OFFICE.

ENOCH T. FERNGREN, OF TOLEDO, OHIO, ASSIGNOR TO THE LIBBEY-OWENS SHEET GLASS COMPANY, OF TOLEDO, OHIO, A CORPORATION OF OHIO.

DRAWING SHEET GLASS.

Application filed August 6, 1923. Serial No. 655,903.

This invention relates to improvements in the art of drawing sheet glass, and more particularly to an improved process and apparatus for facilitating delivery of the molten glass to the sheet source and retaining this glass at the proper temperature and in a homogeneous working condition.

Among the objects are to so improve the design of the receptacle or draw-pot for the molten glass from which the sheet is drawn, and the heating chamber above which this receptacle is supported, that there will be a better heat distribution to the molten glass, and a freer or more even flow of this glass into and through the receptacle and to the sheet source with increased mobility where the edge areas of the sheet are being formed adjacent the side walls of the pot.

Other objects and advantages of this construction will be apparent from the following detailed description.

In the accompanying drawings:

Fig. 1 is a longitudinal vertical section through the improved portions of the apparatus, taken substantially on the line 1—1 of Fig. 2.

Fig. 2 is a horizontal section through a portion of the apparatus, taken substantially on the line 2—2 of Fig. 1.

Fig. 3 is a partial transverse vertical section, taken substantially on the line 3—3 of Fig. 1.

The apparatus here shown is a modification and improvement of the sheet glass drawing system disclosed in the patent to Colburn, 1,248,809, granted December 4, 1917. As in that patent. the molten glass 1 flows from the delivery end 2 of a continuous tank furnace into a shallow receptacle or draw-pot 3, the glass sheet 4 being drawn upwardly from the surface of the molten glass in this receptacle. The draw-pot 3 is closed at its two sides 25 and at one end 5, and is joined to, and is in open communication, with the tank furnace at its other end 6. The receptacle 3 is supported above a heating chamber 7 from which heat is transmitted through the bottom and walls of the shallow receptacle to the molten glass contained therein to maintain this shallow body of glass in the proper working condition. A portion of the molten glass in the receptacle at either side of the sheet source 8 is exposed to the cooling influence of the open air; this cooling being accelerated by the water coolers 9 arranged adjacent to but spaced from the two sides of the sheet 4. The remainder of the surface glass in receptacle 3 adjacent the two ends of the receptacle, and beyond the coolers 9, is covered by a pair of lip-tiles or cover-tiles 10 and 11. All of the above is disclosed in the Colburn patent noted above, although in the present construction the design and proportions of these several parts have been modified as hereinafter described.

The closed end 5 of receptacle 3 is supported within the heating chamber 7 upon a transverse series of arched stools 12, which in turn are supported upon a similar series of larger stools 13, resting upon the floor 14 of chamber 7. The open end of receptacle 3 is supported along a transverse line spaced somewhat from its open end 6, upon the transverse rear wall 15 of chamber 7.

It will be noted that the floor of the cooling tank 2, or delivery end of the tank furnace, slopes gradually upward toward the entrance to draw-pot 3, so that at its open end 16 the bottom block of this tank is of considerable thickness. In former constructions, due to the relatively thin structure of the draw-pot 3 and the heating influence of chamber 7 beneath the pot, molten glass tends to run through the joint between the contacting open ends 6 and 16 of the draw-pot and tank, respectively. To prevent this, it has been necessary to use a cooling means, such as a water pipe, beneath this joint to freeze the glass at this point. This cooling effect is carried through and into the glass flowing into the draw-pot above this joint, causing a gradual accumulation of colder and more plastic glass at this point. This tougher glass will gradually be drawn into the glass stream passing thereover, developing an uneven corded condition in portions of this molten glass and stimulating the formation of "dog-metal" or devitrified glass. In the present construction, the rear wall 15 of the heating chamber has been moved inwardly away from this joint a sufficient distance to allow the interposition of an insulating block 17 beneath that portion of the draw-pot 3 adjacent its open end 6. This in substance makes this end of the pot practically as thick as the enlarged end 16 of the cooling chamber with which it abuts. In this way the joint between the receptacle and tank is made sufficiently deep to be self-sealing and no artificial cooling medium is necessary. A cut out space or clearance 18 may be provided adjacent the lower portion of this joint to increase the radiating area and insure a more perfect seal at this point. Moving the rear wall 15 of the heating chamber inwardly from the extreme rear edge of the pot not only allows for the self-sealing joint above disclosed, but also brings this support nearer the center of gravity of the pot so that an intermediate supporting means for the draw-pot is not required, and the bottom of receptacle 3 beneath the sheet source is left entirely exposed to the open heating space in chamber 7.

The receptacle 3 is shallowest adjacent its closed end 5 to reduce the volume of the sheet-supplying glass therein contained, the bottom of the pot sloping downwardly toward the open end along a plane which is substantially a continuation of the upwardly sloping floor of cooling tank 2, by which the sheet-supplying movement of the glass becomes more easy, while it is gradually speeded by the tractive pull toward the point of sheet emergence. The bottom wall of receptacle 3 varies in thickness, being thicker near the deeper end 19 of the pot and gradually diminishing in thickness toward the shallower end 20. In this way more heat is supplied to the lesser quantity of sheet-supplying glass in the closed end of the pot whereby this glass is allowed to enter the sheet formation at a more rapid rate, and its tendency to become cool and stagnant is averted. The bottom of the pot is slightly arched upwardly between its two lines of support 12 and 15 to strengthen same and render it self-sustaining.

The furnace 7 is heated by burners projected through inlet ports 21. A second row of arched stools 22 similar to the stools 13 previously described, are arranged between these latter stools and the front wall of the heating chamber. The passages 23 provided through each pair of stools 22 and 13, and arranged in front of each inlet port 21 provide individual elongated mixing and preheating chambers for the combustible materials passing in from each burner. These combustible materials will become thoroughly mixed and ignition will take place before the products of combustion from the several burners emerge from the passages 23 into the open heating chamber 7. With this construction, the heating effect at various transverse portions of the furnace may be varied by varying the velocity and proportions of the combustible materials injected through each inlet port 21, and the heated gases before entering the chamber 7 will become so thoroughly diffused that a more even and regular temperature will be provided throughout this heating chamber. These heating gases will be deflected upwardly by the rear wall 15 of the chamber, substantially as indicated by the arrows in the drawings, against the bottom and side walls of receptacle 3, the greatest heating effect normally taking place beneath the sources of the edge portions of the sheet and adjacent the closed end of the receptacle where this heating effect is most desired.

The side portions of the stream of molten glass flowing into the receptacle will naturally be chilled by their contact with or proximity to the side walls of the receptacle and the similar side walls of tank 2, and also their progress will be somewhat impeded by the friction against these side walls. It is therefore desirable to supply a greater amount of heat to these side portions of the molten glass than is distributed to the normally hotter central portion of the flow. The side walls 24 of the heating chamber are. spaced from the side walls 25 of pot 3 to provide spaces 26 for the heated gases to pass up around the side walls of the receptacle. Adjacent the surface cooled areas of the sheet source, these side passages 26 are closed at the top by cover-tiles 27, but adjacent the closed end 5 of the receptacle these side passages are open as at 28 to allow the more highly heated gases to pass up around the sides 25 of the receptacle into the space 29 enclosed by cover-tile 10 above the molten glass in this closed end of the draw-pot and there release their heat. Similar passages 30 are provided alongside the walls 25 of the receptacle adjacent its open end 6 whereby the more highly heated gases from chamber 7 may pass up into the space beneath the other cover-tile 11. These passages 30 may be more or less opened or closed as found desirable by means of the adjustable cover-tile 31. Normally sufficient heat for the surface glass at this end of the draw-pot is provided from the furnace 2, the gases flowing in from the furnace beneath the cover-tile 11.

While portions of the heated gases from chamber 7 pass upwardly through passages 28 to the space 29 beneath cover-tile 10, other portions of these gases that have delivered some of their heat and thus become more heavy, are deflected downwardly from the bottom of the receptacle through passages 32 in supporting stools 12, from which they pass up between the closed end 5 of receptacle 2 and a muffle wall 33 supported on stools 22 and spaced somewhat from the closed end 5 of the draw-pot. Passages 34 are provided at the upper side corners of muffle wall 33 through which the heated gases flow, and thence flow down behind muffle wall 33 to the outlet flue 35. The location of these passages 34 at the sides of the furnace compel the greater portion of the gases to flow toward the side walls where the heating effect is most desired.

It will be noted that there is practically no direct combustion taking place in the chamber 29 above the molten glass in the closed end of the receptacle so that there will be little occasion for the deposition of soot or other products of combustion on this surface glass which is eventually drawn into the sheet. Furthermore, the direction of flow of the heated gases is such that a small amount of cooler air is drawn under the outer end of cover-tile 10 adjacent the surface of the molten glass, and this expanding air will form a blanket between the heated gases and the glass surface to prevent the direct contact of carbon or of the products of combustion with the molten glass. Also the presence of this slight amount of air which passes under the lip-tile will normally insure a more complete combustion along the sides of the pot and thus add to the amount of heat energy released.

It will be noted that the blocks forming the rear wall 15 of the heating chamber are cut away at their upper portions adjacent the sides of the chamber, as indicated at 36. This serves to distribute a greater portion of the heat adjacent the side walls of the pot where it is most desired, and also serves to direct portions of the heated gases upwardly through the passages 30 to the space beneath the cover-tile 11, as previously described.

Additional burners may be directed into the heating chamber 7 through the inlet ports 37 or 38 in the bottom of this chamber, if found necessary or desirable.

In operation, a comparatively deep body of molten glass 1 will flow continuously into the open end 6 of the receptacle 3. The even uninterrupted floor surface at the joint between the draw-pot and tank, offers no obstacles to interrupt or deflect the lower strata of the flowing glass, and since no artificial cooling means are used at this joint, there will be no uneven temperature conditions to promote the formation of devitrified glass. Since the floor of the receptacle slopes gradually upward toward the rounded closed end 5, the lower strata of glass which flows beneath the sheet source to supply this end of the receptacle will be naturally deflected upward to replace the surface glass drawn from this end of the pot to supply the adjacent side of glass sheet 4. The construction of the heating chamber 7 and the heat-distributing passages leading therefrom, as described in detail above, will distribute the major portion of the heat to those locations in the glass supply most subject to retardation and cooling influences, thus tending to properly proportion the temperature and molten condition of the body of the glass throughout all portions of the receptacle 3. There are no supports beneath the main body of the draw-pot adjacent the sheet source to form localized cold areas, but the evenly distributed heat generated in chamber 7 has a free and unobstructed access to all portions of the receptacle bottom in the vicinity of the sheet source. Also, the cover-tiles 10 and 11, the side walls of the heating chamber, and the muffle wall 33, all form continuous radiating surfaces for throwing an even glow of heat toward the body of molten glass in the draw-pot. By decreasing the volume and increasing the temperature and mobility of the glass in the closed end 5 of the pot, the rate of replacement of this glass is greatly increased and the tendency to stagnate and devitrify is eliminated.

Claims:

1. A sheet glass drawing apparatus comprising a receptacle for the molten glass from which the sheet is drawn, the receptacle being closed at one end and in open communication at the other end with a source of molten glass, the receptacle being deeper at the open end than at the closed end, and its bottom wall being thicker at the deeper end and thinner at the shallower end, in combination with a heating chamber above which the receptacle is supported.

2. A sheet glass drawing apparatus comprising a receptacle for the molten glass from which the sheet is drawn, the receptacle being closed at one end and in open communication at the other end with a source of molten glass, the receptacle being deeper at the open end than at the closed end, and its bottom wall being thicker at the deeper end and thinner at the shallower end, the receptacle being supported adjacent its ends above a heating chamber, and the bottom wall being arched upwardly between the points of support.

3. A sheet glass drawing apparatus comprising a receptacle for the molten glass from which the sheet is drawn, the receptacle being closed at one end and in open communication at the other end with a source of molten glass, the receptacle being supported adjacent its ends above a heating chamber, the support beneath the open end of the receptacle being partially cut away adjacent the side edges of the receptacle to permit a greater heating effect at these locations.

4. In a sheet glass drawing apparatus, a receptacle for the molten glass from which the sheet is drawn, in combination with a heating chamber above which the receptacle is supported, the receptacle being in communication at one end with a source of molten glass, cover-tiles above those portions of the molten glass in the receptacle at each side of the sheet source, and passages for conducting heating gases from the heating chamber up around the other three sides of the receptacle to the spaces between the cover-tiles and the molten glass.

5. In a sheet glass drawing apparatus, a receptacle for the molten glass from which the sheet is drawn, in combination with a heating chamber above which the receptacle is supported, the receptacle being closed at one end and in open communication at the other end with a source of molten glass, a cover-tile above the glass in the closed end of the receptacle, and heating passages from the chamber extending up along the two sides of the receptacle to the space between the cover-tile and the molten glass.

6. In a sheet glass drawing apparatus, a receptacle for the molten glass from which the sheet is drawn, in combination with a heating chamber above which the receptacle is supported, the receptacle being closed at one end and in open communication at the other end with a source of molten glass, a cover-tile above the glass in the closed end of the receptacle, and heating passages from the chamber extending up along the two sides and the closed end of the receptacle to the space between the cover-tile and the molten glass.

7. In a sheet glass drawing apparatus, a receptacle for the molten glass from which the sheet is drawn, in combination with a heating chamber above which the receptacle is supported, the receptacle being in open communication at one end with a tank of molten glass, the rear wall of the heating chamber which supports the superposed portion of the receptacle being spaced somewhat from the joint between the receptacle and tank, and an insulating block interposed between this supporting wall and the tank end adjacent the joint.

8. The method of advancing molten glass during the formation of a sheet drawn therefrom, which consists in advancing the glass from a furnace towards, under and past the point from which the sheet is drawn, in causing the glass which advanced past the point of sheet formation to execute a turning movement towards the point of sheet emergence, and in progressively reducing the depth of the said glass toward the region of its turning movement.

9. The method of preventing loss of heat from the side portions of a relatively shallow body of glass in a container from which a sheet is drawn, which consists in so disposing the container and the body of glass therein that heat may be applied externally thereto, in causing the greater proportion of said heat to be applied in the regions along and adjacent the end and side portions of the container, and in utilizing said heat in a reverberatory fashion along the upper surface areas and side portions of the body of glass in the container.

Signed at Toledo, in the county of Lucas and State of Ohio, this 3rd day of August, 1923.

ENOCH T. FERNGREN.